United States Patent [19]

Lindberg

[11] Patent Number: 4,961,672
[45] Date of Patent: Oct. 9, 1990

[54] DRILL AND CUTTING INSERT THEREFOR

[75] Inventor: Hans E. Lindberg, Sandviken, Sweden

[73] Assignee: Sandvik AB, Sandviken, Sweden

[21] Appl. No.: 214,402

[22] Filed: Jul. 1, 1988

[30] Foreign Application Priority Data

Jul. 2, 1987 [SE] Sweden .......................... 8702726-4

[51] Int. Cl.⁵ .......................................... B23B 51/02
[52] U.S. Cl. .................................. 408/144; 408/230;
    408/713; 407/104
[58] Field of Search ............... 408/713, 144, 145, 230,
    408/233; 407/48, 104

[56] References Cited

U.S. PATENT DOCUMENTS

| 4,132,493 | 1/1979 | Hosoi ................................. 408/230 X |
| 4,693,641 | 9/1987 | Tsujimura et al. ............. 408/713 X |
| 4,768,901 | 9/1988 | Reinauer et al. ............... 408/713 X |

FOREIGN PATENT DOCUMENTS 0172148  2/1986  European Pat. Off. .
1274017 11/1960  France ................................ 408/713

Primary Examiner—Z. R. Bilinsky
Attorney, Agent, or Firm—Burns, Doane, Swecker & Mathis

[57] ABSTRACT

A drill for chipforming machining comprising a drill body (11), two cutting inserts (12, 13) and screws (14, 15). The cutting inserts are screwed to cutting insert sites (18, 19) in the axially forward end of the drill (10). The screws force the cutting inserts radially outwardly during tightening until a shoulder (28) at the lower side of each cutting insert abuts against a vertical support surface (22) on the drill body (11). The cutting inserts are tangentially mounted, i.e. they have holes for accomodating the screws, which terminates in the chip surfaces of the cutting inserts.

16 Claims, 1 Drawing Sheet

U.S. Patent    Oct. 9, 1990    4,961,672
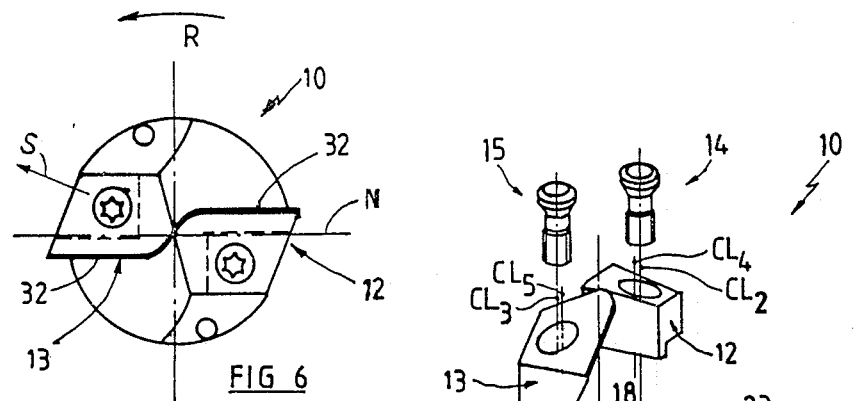
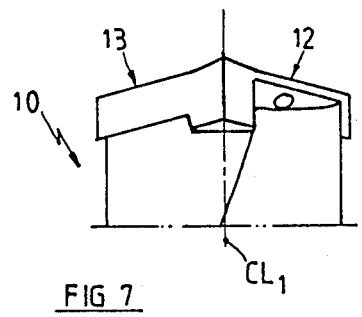
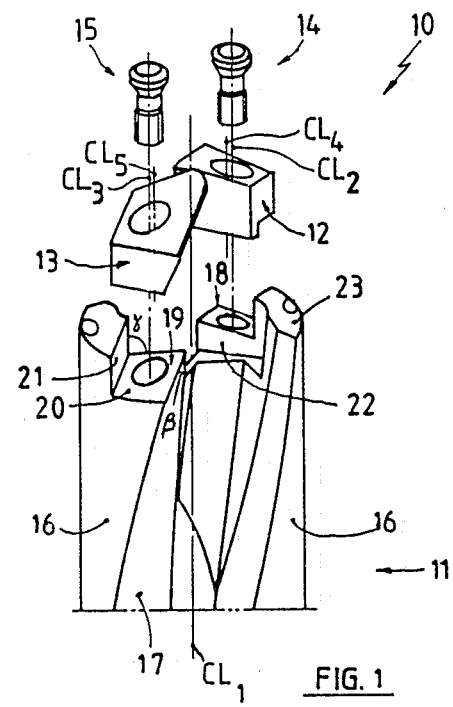
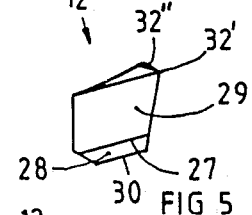
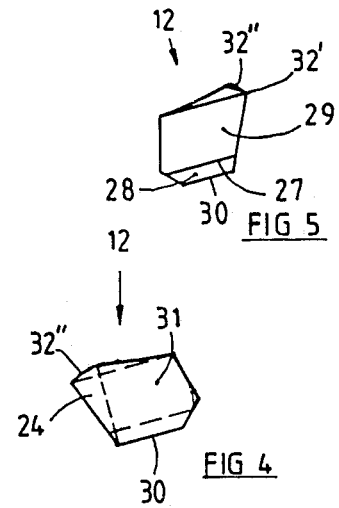
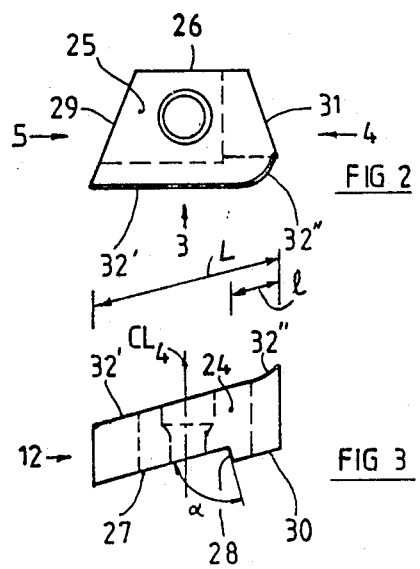
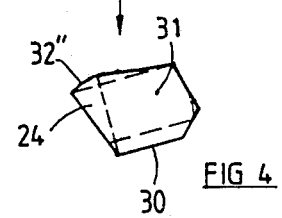

DRILL AND CUTTING INSERT THEREFOR

BACKGROUND AND OBJECTS OF THE INVENTION

The present invention relates to a drill and a cutting insert therefore. The drill comprises a shank, a portion provided with lands and chip flutes, at least one cutting insert site in its axially forward end, provided with a hole, at least one cutting insert, provided with a hole, and tightening means, arranged to to be received by the holes in order to hold the cutting insert in a cutting insert site. The drill has a direction of rotation relative to a work piece and has a center axis. The cutting insert has a cutting edge along the line of intersection of a chip surface and a clearance surface of the cutting insert, the clearance surface being arranged behind the cutting edge in the direction of rotation of the drill. The cutting edge extends from the vicinity of the center axis of the drill towards the periphery of the drill. The cutting insert has a lower side opposite to the clearance surface.

A drill is shown in EP-A2-0 172 148 wherein the hole of the cutting insert terminates in the chip surface of the cutting insert. This means that the insert must be relatively large to be able to accomodate the hole, which negatively influences the strenth of the drill body, when the drill body has a small diameter. Furthermore the known drill is sensitive to tolerance faults.

An object of the present invention is to provide a drill having easily exchangeable cutting inserts.

Another object of the present invention is to provide cutting inserts for the drill that demand little hard material to be produced.

Still another object of the present invention is to provide a drill whose cutting inserts are rigidly fixed to the drill body.

Still another object of the present invention is to provide a drill whose cutting inserts can be covered by wear resistent layers.

Still another object of the present invention is to provide a drill whose cutting inserts can consist of a very hard material.

Still another object of the present invention is to provide a drill being relative unsensitive to tolerance faults.

THE DRAWINGS

The invention will be more closely described hereinafter in connection with the accompanying drawings.

FIG. 1 shows a drill in an exploded view.

FIGS. 2 to 5 show a cutting insert in a top view and in three different side views, according to the arrows 3, 4 and 5 in FIG. 2, respectively.

FIGS. 6 and 7 show the drill in a top view and a side view, respectively.

DETAILED DESCRIPTION OF PREFERRED EMBODIMENTS OF THE INVENTION

The drill 10, shown in FIG. 1, according to the present invention comprises a drill body 11, two cutting inserts 12, 13 and two screws 14, 15. The drill body 11 has a cylindrical shank, not shown. Two lands 16 are connected to the shank. The drill body has screw shaped or straight chip flutes 17. Two identical cutting insert sites 18, 19 are arranged in the forward end of the drill. Therefore only one site will be described hereinafter. The site 18 or 19 comprises a planar axial support surface 20, a planar tangential support surface 21 and a planar radial support surface 22. The words "axial", "tangential" and "radial" relates to the cutting forces that each support surface is supposed to receive. The axial and tangential support surfaces 20, 21 enclose an angle $\gamma$ of about 60 to 90 degrees. The axial and radial support surfaces 20, 22 enclose an angle $\beta$ in the magnitude of 60 to 105 degrees. The axial support surface 20 forms an acute angle with the center axis $CL_1$ of the drill. The intersection of the tangential support surface 21 and the front surface 23 of the drill is essentially parallel with the intersection of the axial support surface 20 and the chip flute 17. The last-mentioned intersection coincides with or is essentially parallel with a normal N to the center axis $CL_1$ and is arranged essentially perpendicular to the radial support surface. The radial support surface 22 extends from the axial support surface and axially rearwards. The axial support surface is provided with a threaded bore whose center axis $CL_2$ or $CL_3$ is arranged parallel with the center axis $CL_1$ of the drill. The center line of each hole is arranged at a certain distance from the tangential support surface 21 and the radial support surface 22. Furthermore the drill is provided with fluid passages.

The cutting inserts 12, 13, which also are shown in FIGS. 2 to 5, are identical and therefore only one insert 12 will be described hereinafter. The insert, which has the basic shape of a tetrahedron, has a chip surface 24, which forms an acute internal angle with a first clearance surface 25, a side support surface 26, a lower second support surface 27, a lower third support surface 28 in the form of a step, a second clearance surface 29, a free lower surface 30 and a free radially inner surface 31. The rear support surface 26 is parallel with and is arranged at a distance from the normal N. A cutting edge 32 is arranged at the intersection of the chip surface 24 and the first clearance surface 25 and extends from the center axis $CL_1$ towards the periphery. The last-mentioned surfaces 24 and 25 are formed such that the outer portion 32' of the cutting edge 32 is straight over the major part of the insert and has a constant curvature at the radially, inner portion 32, i.e., radially relative to the center axis of the drill. The inner portion 32" also climbs upwardly relative to the clearance surface 25. The outer portion 32' of the cutting edge is essentially parallel with the lower second support surface 27, which is planar. The lower third support surface 28 consists of a step between the lower second support surface 27 and the free lower surface 30. The height of the step is about 10 to 40% of the height of the insert. The support surface 28 is planar, essentially perpendicular to the normal N and is perpendicular to or forms an acute angle $\alpha$ with the support surface 27. The angle $\alpha$ is between 75 and 115 degrees. The insert 12 has a hole which extends from the lower second support surface 27 to the first clearance surface 25. The center axis of the hole is parallel with the free inner surface 31, the side support surface 26 and the second clearance surface 29. The center axis $CL_4$, $CL_5$ is arranged at a certain distance from the side support surface 26 and from the lower third support surface 28. The length L of the insert is between 8 and 40 mm while the length l of the free lower surface 30 is about 0.1 to 0.3 L.

When mounting the drill one of the inserts 12 is put such that its support surfaces 26, 27 and 28 engage the corresponding surfaces 21, 20 and 22 of the drill body 11, i.e. the insert is tangentially mounted. Thereafter a screw 14 is inserted into the hole of the insert whereafter it engages the threads of the bore in the drill body. When the screw is tightened the insert is forced to a stable abutment against the surfaces 20, 21, 22. The center axis $CL_2$ of the bore is provided radially outwards of the center axis $CL_4$ of the insert hole and therefore the screw is prestressed during tightening, such that the insert is forced in a direction S radially outwards, which direction forms an acute angle with the normal N to the center axis of the drill. The diametrically opposite insert 13 is mounted in a corresponding manner, such that the cutting edges 32 essentially meet at the center axis $CL_1$. The ends of the cutting edges 32 meet or are provided close to each other at the center of the drill, which is shown in FIGS. 6 and 7. The cutting edges form a mainly S-shaped edge portion, which is more closely described in Hosoi U.S. Pat. No. 4,132,493, incorporated herein by reference.

The process is reversed at replacement of the inserts.

It should be understood that the drill can be modified without departing from the scope of the claims. For example the step surface 28 can be a part of a recess in the insert wherein the recess engages a shoulder on the surface 20 of the site 18 or 19. (In either case, the surface 28 forms a step between axially offset portions of the lower surface of the insert.) Then the recess and the shoulder are placed radially outside the hole of the insert and the site, respectively, such that the insert may be pushed by the screw 14 or 15 towards the shoulder during tightening of the screw.

A drill formed according to the present invention provides for a plurality of advantages. The insert are easily exchangeable. The inserts can be made relatively small and therefore demand little hard material for their production. The inserts are rigidly held within the sites of the drill body. Compared to conventional brazed drills the drill according to the present invention can be provided with inserts having more wear resistant but more heat sensitive hard material and coatings.

I claim:

1. A drill comprising a shank defining a longitudinal center axis, said shank having longitudinal lands, longitudinal chip flutes between said lands, and at least one insert site disposed at a front axial end of said shank, said insert site comprising a generally axially forwardly facing surface having a first hole therein, a generally tangentially disposed surface extending axially from said generally axially forwardly facing surface, and a generally radially disposed surface extending generally axially from said generally axially forwardly facing surface, a cutting insert mounted in said insert site, said insert comprising a generally axially forwardly facing clearance surface, a chip surface facing generally away from said generally tangentially disposed surface and intersecting said clearance surface to form a cutting edge therewith, a side surface facing said generally tangentially disposed surface, and a generally axially rearwardly facing lower surface including a first portion abutting said generally axially forwardly facing surface, a second portion offset axially relative to said first portion, and a step surface interconnecting said first and second portions and facing said generally radially disposed surface, a second hole extending through said insert from said clearance surface to said first portion of said lower surface, and a tightening member extending through said second hole and received in said first hole for securing said insert to said insert site.

2. A drill according to claim 1, wherein said insert is L-shaped when viewed in a direction toward said chip surface.

3. A drill according to claim 1, wherein said second hole has an axis oriented non-perpendicularly relative to said first portion of said lower surface so that said tightening member urges said step surface against said generally radially disposed surface.

4. A drill according to claim 1, wherein said step surface is oriented at an acute angle relative to said first portion of said lower surface, said generally radially disposed surface oriented at the same acute angle relative to said generally axially forwardly facing surface.

5. A drill according to claim 4, wherein said insert is L-shaped when viewed in a direction toward said chip surface.

6. A drill according to claim 1, wherein said step surface is oriented at an acute angle relative to said first portion of said lower surface, said generally radially disposed surface oriented at the same acute angle relative to said generally axially forwardly facing surface.

7. A drill according to claim 1, wherein said generally tangential surface is oriented non-perpendicularly relative to said generally axially forwardly facing surface.

8. A drill according to claim 1, wherein a center axis of said first hole is slightly offset radially outwardly relative to a center axis of said second hole before said tightening member is tightened, so that upon tightening of said tightening member said step surface is biased against said generally radially disposed surface.

9. A drill according to claim 1, wherein said generally radial surface extends axially rearwardly of said generally axially forwardly facing surface, and said generally axially tangentially disposed surface extends axially forwardly of said generally forwardly facing surface.

10. A drill according to claim 1, wherein a line of intersection between said generally axially forwardly facing surface and its associate flute forms an acute angle with said generally radially disposed surface.

11. A drill according to claim 1, wherein there are two said insert sites and two said inserts, said inserts arranged such that their cutting edges meet adjacent said center axis and together form a generally S-shape in the vicinity of said center axis.

12. A cutting insert for a drill bit comprising a clearance surface, a chip surface intersecting said clearance surface to form a cutting edge therewith, a lower surface disposed opposite said clearance surface and adapted to engage an axially forwardly facing surface of the drill bit, said lower surface including first and second portions offset from one another in a direction transversely of a plane of said clearance surface to form a step surface therebetween whereby said insert is of L-shape as viewed in a direction toward said chip surface, and a hole extending through said insert from said clearance surface to said first portion of said lower surface, a central axis of said hole being oriented non-perpendicularly to said first portion of said lower surface.

13. A cutting insert according to claim 12, wherein said step surface is non-perpendicular relative to said first portion of said lower surface.

14. A cutting insert according to claim 13, wherein said step surface extends from said first portion of said lower surface in a direction away from said central axis of said hole.

15. A cutting insert according to claim 2, wherein said insert includes a side support surface situated opposite said chip surface, said step surface extending completely across said lower surface so as to intersect both said chip surface and said side support surface.

16. A cutting insert according to claim 12, wherein said insert includes an inner surface intersecting said chip surface, said clearance surface, and said lower surface, an end of said cutting edge situated adjacent said inner surface being of convex curvature as viewed in a direction toward said clearance surface and extending away from said lower surface as it approaches said inner surface.

* * * * *